United States Patent [19]

Ackerman

[11] Patent Number: 4,560,244

[45] Date of Patent: Dec. 24, 1985

[54] APPARATUS AND METHOD FOR REDIRECTING AN INCIDENT BEAM

[75] Inventor: Charles B. Ackerman, Paradise Valley, Ariz.

[73] Assignee: Solavolt International, Houston, Tex.

[21] Appl. No.: 623,891

[22] Filed: Jun. 25, 1984

[51] Int. Cl.⁴ .............................................. G02B 7/18
[52] U.S. Cl. ................................................. 350/486
[58] Field of Search ................ 350/486, 632, 6.9, 637

[56] References Cited

U.S. PATENT DOCUMENTS 3,724,953 4/1973 Johnston, Jr. ...................... 350/486
4,126,393 11/1978 Sumikama et al. ................ 350/486

Primary Examiner—John K. Corbin
Assistant Examiner—Rebecca D. Gass
Attorney, Agent, or Firm—William J. Kubida; John A. Fisher

[57] ABSTRACT

An apparatus and method for redirecting an incident beam makes use of a wobble plate to precess the normal to the mirror surface about a predetermined axis coupled with a rotational movement about the axis of the wobble plate to provide the second degree of freedom needed to place the reflected beam exactly on target.

17 Claims, 1 Drawing Figure

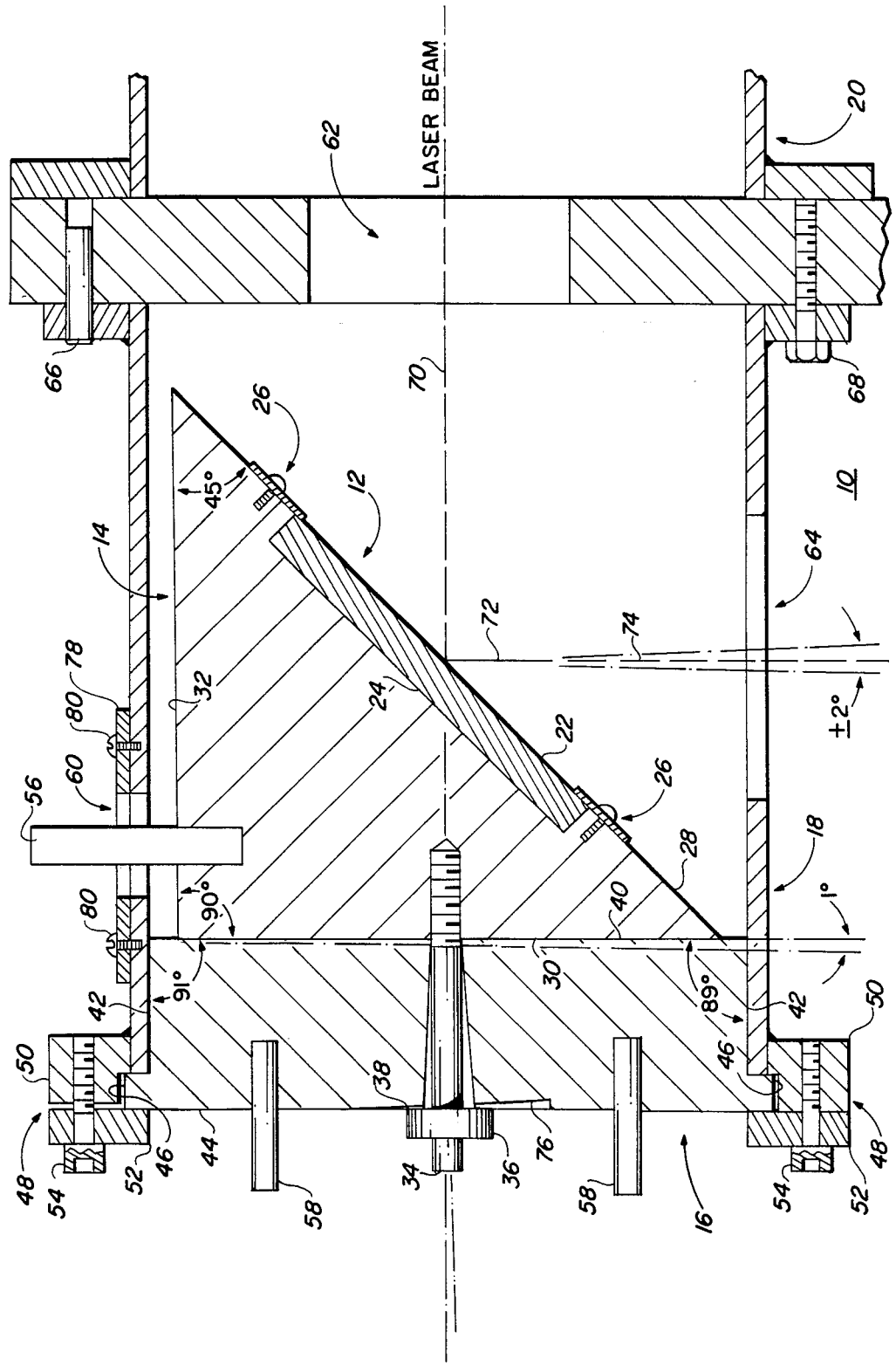

APPARATUS AND METHOD FOR REDIRECTING AN INCIDENT BEAM

BACKGROUND OF THE INVENTION

The present invention relates, in general, to the field of apparati and methods for redirecting an incident beam. More particularly, the present invention relates to a simple adjustable mirror mount for redirecting high energy beams, for example, the output of high power lasers.

Various devices are available for redirecting the output of high beam energy sources, such as certain lasers, by means of a mirror. However, an important consideration in the utilization of such mirrors is the provision of an acceptable thermal path to dissipate heat energy absorbed by the mirror. Generally, existing mirrors comprising plated copper, silicon or polished molybdenum surfaces have a reflective efficiency of approximately 98–99%. However, with high beam energies on the order of a few kilowatts, it can be seen that a significant heat build-up can nonetheless occur in the absence of an effective means for its dissipation. Such heat build-up, if not properly dissipated, can result in distortion of the mirror surface with a concomitant misalignment or distortion of the reflected wavefront.

The problems attendant the heating effect due to this relatively small but nonetheless significant amount of absorbed energy becomes particularly acute when the angular attitude of the mirror must be adjustable about some predetermined angle. The most common mechanisms used to provide these small angular adjustments tend to support the mirror mount on three adjustable points under spring tension. Such mechanisms do not provide a good thermal path to a large area cooling surface. Other existing devices include a ball and socket mounting which provides a relatively large thermal contact surface but which is an expensive configuration to machine to adequate tolerances. Such ball and socket apparati furthermore, do not provide a relatively rigid, vibration free support for the mirror.

SUMMARY OF THE INVENTION

It is therefore an object of the present invention to provide an improved apparatus and method for redirecting an incident beam.

It is further an object of the present invention to provide an improved apparatus for redirecting an incident beam which is readily and inexpensively effectuated.

It is still further an object of the present invention to provide an improved apparatus and method for redirecting an incident beam which provides a large cross-sectional thermal path to a convective surface of a housing permitting a reflective surface to dissipate absorbed energy.

It is still further an object of the present invention to provide an improved apparatus and method for redirecting an incident beam which provides sufficient lateral conductivity to minimize thermal gradients which might otherwise distort a reflective surface, thereby distorting a reflected wave front.

It is still further an object of the present invention to provide an improved apparatus and method for redirecting an incident beam which provides a rigid, vibration free support for a reflective surface.

The foregoing and other objects are achieved in the present invention wherein there is provided an apparatus and method for redirecting an incident beam to a point located obliquely therefrom. The apparatus includes a reflective surface for interception of the incident beam which, in turn, provides a reflected beam therefrom. A mounting block has a mounting face for the reflective surface and an angularly disposed transverse surface. A wobble plate is rotatably secured to the transverse surface of the mounting block at a beveled surface thereof. A housing is provided for rotatable retention of the wobble plate, the housing having respective apparatus for receipt and transmission of the incident and reflected beams. In operation, the reflected beam may be deflected longitudinally by rotation of the mounting block with respect to the wobble plate and transversely to the obliquely located point by rotation of the wobble plate and mounting block with respect to the housing.

BRIEF DESCRIPTION OF THE DRAWINGS

The above-mentioned and other features and objects of the present invention and the manner of attaining them will become more apparent and the invention itself will be best understood by reference to the following description of an embodiment of the invention taken in conjunction with the accompanying drawings, wherein:

The single FIGURE is a simplified partially cut-away top plan view of an adjustable mirror mount in accordance with the present invention for use, for example, with a high energy laser beam.

DESCRIPTION OF A PREFERRED EMBODIMENT

Referring to the single FIGURE, an adjustable mirror mount 10 is shown. Adjustable mirror mount 10 comprises, in part, a mirror 12 secured to a mounting block 14 which, in turn, is rotatably secured to wobble plate 16. Wobble plate 16 is rotatably retained within housing 18 which may be secured to a laser tube 20 for use in conjunction with a laser device.

Mirror 12 presents a reflective face 22 and opposite and generally parallel thermal contact face 24. Mirror 12 is secured to mounting surface 28 of mounting block 14 by means of a plurality of mounting clamps 26. Mirror 12 may comprise a plated copper, silicon, polished molybdenum or other suitably reflective surface for redirecting an incident beam 70 to a reflected beam 72. It should also be noted that mirror 12 may be formed within or upon mounting block 12 such that mounting clamps 26 would be obviated. In utilization of the embodiment shown, a silicone grease may be placed on thermal contact face 24 at its interface with mounting block 14 to increase thermal contact and fill in any air gap therebetween.

Mounting block 14 comprises a generally triangular shaped section of aluminum or other suitable structural and thermal conductive material. Mounting block 14 may comprise a portion of a cylinder or other geometric solid. In the former instance, mounting surface 28 would comprise a generally eliptical surface. Mounting block 14 also includes a circumferential surface 32 and a perpendicularly disposed transverse surface 30. In the embodiment shown, circumferential surface 32 and transverse surface 30 form an angle of 45° with respect to mounting surface 28 and thus, are at right angles to each other.

Wobble plate 16 comprises a generally cylindrical shaped member of aluminum or other similar structural and thermal conductive material such as might be provided for mounting block 14. Preferably, mounting block 14, wobble plate 16, and housing 18 are all formed of a thermally conductive metallic material. Wobble plate 16 includes a beveled surface 40 and oppositely disposed outer surface 44. A cylindrical periphery 42 surrounds the generally circular cross-section of wobble plate 16 in addition to a rim 46. Mounting block 14 is rotatably secured to wobble plate 16 by means of clamping bolt 34, clamping nut 36 and washer 38. As above described, a silicone grease may be applied between mounting block 14 at transverse surface 30 thereof and wobble plate 16 at beveled surface 40 thereof. Washer 38 may be a conventional elastic or spring washer. It should be noted, that an alternative would be to utilize a stiff spring to accommodate the necessary misalignment of clamping bolt 34 and secure mounting block 14 to wobble plate 16. As shown, beveled surface 30 of wobble plate 16 is formed such that beveled surface 40 forms an angle 1° off axis with respect to cylindrical periphery 42 providing a wobble angle of ±1° or a total of 2°.

Wobble plate 16 is rotatably retained within housing 18 by means of rim 46 being releasably secured within clamping flange 48. Clamping flange 48 comprises a bolt plate 50 which may be welded or otherwise rigidly secured to housing 18 and a corresponding and generally circular mounting ring 52 having a plurality of apertures for receiving bolts 54. Thus, wobble plate 16 may be rotated in housing 18 and secured in position by means of the respective loosening and tightening of bolts 54 of clamping flange 48. Rotation of wobble plate 16 with respect to housing 18 is facilitated by means of adjustment pins 58. Mounting block 14 is secured against rotation by adjustment pin 56 protruding through a longitudinal slot 60 in slotted plate 78 secured to housing 18 by bolts 80.

In the embodiment shown, incident beam 70 is directed through incident beam aperture 62 of housing 18 for redirection by reflective face 22 of mirror 12. A reflected beam 72, nominally along center line 74 in turn passes through reflected beam aperture 64 of housing 18. Housing 18, which provides a large convective surface for dissipation of any energy absorbed by mirror 12 which is in turn conducted to it through mounting block 14 and wobble plate 16 may be secured to laser tube 20 by means of dowel 66, bolt 68 or other similar and suitable rigid means for affixation. As shown, a wobble angle of 2° provided at beveled surface 40 of wobble plate 16 provides an angular adjustment of reflected beam 72 of 4°.

As above-described, mounting block 14 is secured against rotation by adjustment pin 56 which is constrained by longitudinal slot 60 in slotted plate 78 which only permits movement in the longitudinal direction. Thus, longitudinal deflections are achieved by slightly loosening clamping nut 36 and mounting ring 52 and rotating wobble plate 16 by means of adjustment pins 58 and resecuring clamping nut 36.

Transverse adjustments are made by loosening bolts 80 which hold slotted plate 78 and rotating wobble plate 16 and mounting block 14 as a unit. After the adjustment is completed, mounting ring 52 and slotted plate 78 are resecured.

The off axis surface of 1° gives an angle of adjustment for mirror 12 of ±1° or 2° total. This deflection is doubled again by reflection to ±2° or 4° total. The thermal contact surfaces between mirror 12 and mounting block 14 as well as mounting block 14 with respect to wobble plate 16 are all planar surfaces which can be relatively inexpensively machined to a very fine finish. The use of a silicone thermal lubricant can further improve thermal contact.

What has been provided therefore, is an improved apparatus and method for redirecting an incident beam which provides a large cross-sectional thermal path to a convective surface of a housing permitting a reflective surface to dissipate absorbed energy. The improved method and apparatus for redirecting an incident beam of the present invention provides sufficient lateral conductivity to minimize thermal gradients which might otherwise distort a reflective surface thereby distorting a reflected wave front. The apparatus and method of the surface invention provides a rigid, vibration free support for a reflective surface.

While there have been described above the principles of this invention in conjunction with specific apparatus, it is to be clearly understood that this description is made only by way of example and not as a limitation to the scope of the invention.

I claim:

1. An apparatus for redirecting an incident beam to a point located obliquely therefrom comprising:
   a reflective surface for interception of said incident beam, said reflective surface providing a reflected beam therefrom;
   a mounting block having a mounting face and an angularly disposed transverse surface thereof, said mounting face for retention of said reflective surface;
   a wobble plate having a beveled surface thereof rotatably secured to said transverse surface of said mounting block; and
   a housing for rotatable retention of said wobble plate, said housing having respective apertures for receipt and transmission of said incident and reflected beams;
   whereby said reflected beam may be deflected longitudinally by rotation of said wobble plate with respect to said mounting block and transversely to said obliquely located point by rotation of said wobble plate and said mounting block with respect to said housing.

2. The apparatus of claim 1 wherein said incident beam is a high energy laser beam.

3. The apparatus of claim 1 wherein said reflective surface comprises optically reflective silicon.

4. The apparatus of claim 1 wherein said reflective surface comprises an optically reflective copper plating.

5. The apparatus of claim 1 wherein said reflective surface comprises optically reflective molybdenum.

6. The apparatus of claim 1 wherein said mounting block, wobble plate and housing comprise a thermally conductive metallic material.

7. The apparatus of claim 1 wherein said beveled surface provides a wobble angle of 2°.

8. The apparatus of claim 1 further comprising:
   a laser secured to said housing by a laser tube adjacent said aperture for receipt of said incident beam.

9. The apparatus of claim 1 further comprising:
   an adjustment pin for holding said mounting block with respect to said wobble plate.

10. A method for redirecting an incident beam to a point located obliquely therefrom comprising the steps of:

intercepting said incident beam by a reflective surface, said reflective surface providing a reflected beam therefrom;

mounting said reflective surface to a mounting block at a mounting face thereof, said mounting block presenting an angularly disposed transverse surface thereof;

rotatably securing said mounting block at said transverse surface thereof to a wobble plate at a beveled surface thereof;

rotatably retaining said wobble plate in a housing having respective apertures for receipt and transmission of said incident and reflected beams;

longitudinally deflecting said reflected beam by rotation of said wobble plate with respect to said mounting block; and transversely deflecting said reflected beam to said obliquely located point by rotation of said wobble plate and said mounting block with respect to said housing.

11. The method of claim 10 wherein said step of intercepting is carried out by means of optically reflective silicon.

12. The method of claim 10 wherein said step of intercepting is carried out by means of an optically reflective copper plating.

13. The method of claim 10 wherein said step of intercepting is carried out by means of optically reflective molybdenum.

14. The method of claim 10 wherein said step of mounting is carried out by means of a mounting clamp.

15. The method of claim 10 wherein said step of rotatably securing is carried out by means of a clamping bolt and clamping nut.

16. The method of claim 10 wherein said step of rotatably retaining is carried out by means of a clamping flange.

17. The method of claim 10 further comprising the step of:

providing an adjustment pin for holding said mounting block with respect to said wobble plate.

* * * * *